Patented Oct. 17, 1950

2,525,830

UNITED STATES PATENT OFFICE 2,525,830

RECOVERY OF ANHYDROUS ALUMINUM CHLORIDE FROM A FLUID ALUMINUM CHLORIDE-HYDROCARBON COMPLEX

Howard R. Sailors and Harold J. Hepp, Bartlesville, Okla., assignors to Phillips Petroleum Company, a corporation of Delaware No Drawing. Application December 10, 1945, Serial No. 634,053

8 Claims. (Cl. 23—96)

This invention relates to the recovery of anhydrous aluminum chloride from an aluminum chloride-hydrocarbon complex, such as those obtained in the alkylation or isomerization of hydrocarbons utilizing aluminum chloride as a catalyst.

The conversion of hydrocarbons in the presence of a catalyst of aluminum chloride is not new. Many processes of hydrocarbon cracking, isomerization and alkylation have been developed in the period since the discovery of the catalytic power of anhydrous aluminum chloride by Friedel and Crafts.

In the early history of the use of aluminum chloride in petroleum cracking, anhydrous aluminum chloride per se was charged to the still and used over and over until inactive sludgy or a coke-like material composed of aluminum chloride and highly degraded carbonaceous materials was formed.

In the present-day practice of alkylation and isomerization, aluminum chloride is frequently used as a catalyst in the form of a fluid aluminum chloride-hydrocarbon complex. When complex is used, the catalyst activity is maintained by the addition of anhydrous aluminum chloride, which dissolves in the complex. As the reaction proceeds, the fortifying aluminum chloride forms more complex, and in continuous operation, in which the activating aluminum chloride is added continuously or batchwise, the volume of catalyst in the system tends to increase unless the excess complex manufactured in the process is withdrawn, this withdrawal being either continuous or batchwise. The complex withdrawn contains a substantial amount of aluminum chloride but not in a form which may be directly utilized in promoting the reaction. The complex withdrawn is well described as equilibrium complex, and will so be referred to in the remainder of this disclosure.

Because of the cost of aluminum chloride, it is desirable to recover said aluminum chloride in anhydrous form from the coky residue from a cracking still or from the fluid equilibrium complex separated from alkylation or isomerization reactions, for by this means the net catalyst consumption of either process is reduced.

The exact nature of these sludges derived from the treatment of hydrocarbons with aluminum chloride is not known, although it is reasonable to assume that the composition will vary with both the hydrocarbon being treated with aluminum chloride and the conditions of treatment. Thus the sludgy or coky residues which result from the aluminum chloride-catalyzed cracking of gas oil at temperatures of 500° F. or higher contain the aluminum chloride in a tightly bound form which renders recovery of aluminum chloride difficult. The methods proposed for the recovery of aluminum chloride from such residues stress the use of high temperatures, frequently in conjunction with chlorine, hydrogen chloride, and the like. On the other hand we have found that a portion of the aluminum chloride contained in the equilibrium complex described above appears in the main to be relatively weakly bound to the hydrocarbons present. Consequently recovery of at least a substantial part of the aluminum chloride contained in such complexes may be simply and economically effected in the manner described below without the expense and inconvenience of using chlorine, hydrogen chloride, or high temperatures. It is with these latter "equilibrium complexes" that this invention is chiefly concerned.

In the processes previously proposed for the recovery of anhydrous $AlCl_3$ from the cracking still coky residue or fluid equilibrium complex, these materials are charged to a retort or similar apparatus and subjected to destructive distillation and/or treatment with chlorine, hydrogen chloride, and the like. The aluminum chloride and some hydrocarbons distill out of the retort, and a hard, carbonaceous residue remains in the retort. The removal of this hard, carbonaceous residue from the vessel is a difficult, time-consuming, and costly part of the aluminum chloride recovery operation.

It is an object of this invention to provide an improved process for the recovery of anhydrous aluminum chloride from a fluid aluminum chloride-hydrocarbon complex. It is another object of the invention to permit distillation of aluminum chloride from the complex while avoiding the formation of solid deposits in the distillation zone while permitting separation of residual complex in a fluid state.

It is a further object of the present invention to provide a two stage process for the recovery of aluminum chloride in which coking of complex in the primary distillation zone is avoided while enabling continuous flow of complex through the distillation zone.

We have now discovered that a considerable proportion of the aluminum chloride present in a fluid aluminum chloride-hydrocarbon complex can be recovered as anhydrous aluminum chloride by destructive distillation without the formation of the difficultly-handled, hard, carbonaceous residue.

The exact nature of the bond between the aluminum chloride molecule and the hydrocarbon molecule in the fluid complex of these two materials is not known. The complex is usually a dark, mobile fluid, often referred to in the art as a "red oil."

The complex on heating will decompose to release aluminum chloride and vapors of hydrogen, hydrogen chloride, and hydrocarbons, this reaction occurring at a detectable rate at about 400° F. and being quite rapid above 600° F. Temperatures up to 1800° F. have been used in the destructive distillation of complexes, the residues in the retort being the previously-described, hard, carbonaceous residue.

The formation of this hard residue, as we have now found, is a function of time and temperature, and prior to the formation of this hard residue a considerable portion of the aluminum chloride distills from the fluid complex when it is heated. Thus, as an illustration, a process is now possible wherein a fluid complex is subjected to destructive distillation, a portion of the aluminum chloride is distilled from the complex and recovered, and a fluid residue withdrawn from the vessel. The viscosity of the residue following the distillation is usually increased over that of the complex prior to distillation, however.

The exact amount of aluminum chloride which is recoverable prior to the formation of the hard, coky residue will vary somewhat for individual complexes but may be readily determined by experiment. In general, 50 per cent or less of the AlCl₃ present in the complex is recoverable by simple distillation as described herein without the formation of hard residues. For example, when an equilibrium complex containing about 56 per cent aluminum chloride from an ethylene-isobutane alkylation process was heated until 45 per cent of the aluminum chloride present in the original complex had been distilled out, the kettle residue was quite fluid when cooled to 200° F. However, a second sample of this same complex was distilled until 65 per cent of the aluminum chloride originally present was distilled out, and the residue from this distillation was solid at 600° F.

The following discussion is of one specific embodiment of this invention. Equilibrium fluid aluminum chloride-hydrocarbon complex from an olefin-isobutane alkylation process or an isomerization process is conducted through a pipe to a retort operated at 450–675° F. Through another pipe a low-boiling hydrocarbon substantially unaffected at the conditions prevailing in the retort, or other substantially non-reactive gas, is conducted to a furnace, where it is heated to a temperature above the operating temperature of the retort and is thence conducted through a pipe to the retort where it enters the lower part of the retort, below the surface of the complex undergoing destructive distillation, through a plurality of openings. The temperature of the entering gas is sufficiently high so that it will furnish the heat necessary to carry out the destructive distillation of the complex.

In the retort, the equilibrium complex decomposes to yield a vaporous product containing aluminum chloride and other gases, such as hydrocarbons and some hydrogen and hydrogen chloride. The temperature and time of residence of the liquid remaining in the retort is so correlated that the formation of a solid mass in the retort is avoided. The fluid residue is removed through a pipe. This residue may be treated with steam to recover the remaining chlorine as hydrogen chloride. It may be cooled and extracted with water to recover hydrated aluminum chloride in solution if desired, or it may be subjected to further destructive distillation at higher temperature in a coking vessel for the recovery of additional anhydrous aluminum chloride. The hydrated aluminum chloride may then be recovered from solution by evaporation and crystallization.

The vapors in the retort are removed through a pipe and conducted to a quench tank. A hydrocarbon stream is conducted to the quench tank where it comes in contact with the vaporous aluminum chloride for example, as a hydrocarbon spray, and condenses the aluminum chloride. The vapors from the quench tank are removed through a pipe to a vapor recovery system or other recovery or disposal means not shown. The aluminum chloride and liquid hydrocarbons are removed from the tank, through a pipe as a slurry. If desired, the aluminum chloride may be filtered from the slurry and utilized as dry aluminum chloride, or the slurry of aluminum chloride and hydrocarbon may be pumped to the alkylation or isomerization reaction zone, to supply at least a part of the aluminum chloride required to maintain the activity of the catalyst.

In a retort heated by other means than that in this illustration, a carrier gas is not necessary, although it can be included if desired. Hydrocarbons are freed in the decomposition taking place during the distillation, and thus a carrier gas is present whether specifically added or not.

The process may be operated at any convenient pressure from atmospheric upward. It is desirable to operate above the vapor pressure of the quench stream at the prevailing temperature in a quench tank and frequently it is convenient to operate at pressure high enough to permit the direct discharge of the aluminum chloride and liquid hydrocarbons slurry stream to a subsequent conversion zone or other process.

It is apparent that the foregoing procedure is particularly adapted to continuous operation since the complex is not permitted to become hard or excessively viscous and may flow continuously through the retort at the desired rate, and thence through subsequent washing or other suitable treatment for removal of residual, more tightly bound AlCl₃, if desired. In view of its fluid condition, the complex may be more readily washed or otherwise treated for removal of such residual AlCl₃, than if it were in a solid state as the result of excessive distillation in the initial AlCl₃ recovery step. In this way the total amount of AlCl₃ recoverable is increased. As a matter of fact the economic advantages of being able to initially distill continuously, and without solidification or coking, are sufficiently great to permit dispensing with further recovery of AlCl₃ from the fluid distilled product from which the more readily obtainable AlCl₃ has been recovered.

As gases utilized to aid in the separation of the AlCl₃ from the complex, nitrogen, hydrogen, methane, ethane, propane, etc., or any gas not reacting on or with the complex under the conditions of distillation may be used.

*Example I*

To a glass flask connected to an air condenser, 196 grams of equilibrium fluid aluminum chloride-hydrocarbon complex containing about 56 weight per cent aluminum chloride from an ethylene-isobutane alkylation system was charged. The flask was then heated, the temperature being raised from 400° F. to 600° F. over a period of one hour. Dry nitrogen was bubbled through the complex during the distillation. When the temperature in the flask reached 600° F., the heating was discontinued, and the residue was cooled. At 200° F., the residue was quite fluid. The aluminum chloride recovered in the air condenser amounted to 45 per cent of that contained in the charge.

*Example II*

To the apparatus used in the previous example, 197 grams of the same complex was charged to the flask. With dry nitrogen bubbling through the complex, the flask was heated. The temperature was raised from 400 to 640° F. over a period of 80 minutes, after which time the heating was discontinued and the flask cooled. The residue was quite fluid at 600° F., but showed rather high viscosity at 200° F. The aluminum chloride recovered from the air condenser amounted to 49 per cent of the aluminum chloride contained in the complex charged to the flask. The liquid residue is then water washed in an agitated vessel to effect intimate contact between hot water and the complex. Hydrated AlCl₃ is recovered in an amount equivalent to about 40 per cent of that initially present, and the total amount of AlCl₃ recovered is about 90%.

*Example III*

To the same apparatus, 192 grams of the same complex used in previous examples was charged. The flask was heated, and nitrogen was bubbled through the complex during the heating as before. The temperature of the flask was raised from 400 to 600° F. over a period of 50 minutes, and was then held at 600° F. for four hours. The residue in the flask after this time was solid at 600° F. The AlCl₃ recovered in the air condenser amounted to 65 per cent of that in the complex charged to the flask.

We claim:

1. A process for the recovery of anhydrous aluminum chloride from an aluminum chloride-hydrocarbon complex formed during the catalytic conversion of hydrocarbons in the presence of aluminum chloride as a catalyst, which comprises continuously flowing said complex through a distillation zone in the absence of a solvent continuously flowing through said complex a gas inert thereto to remove not to exceed about 50 per cent of the aluminum chloride by vaporization while maintaining the complex in a fluid condition, supplying heat for the distillation of said complex by means of said inert gas, and continuously separating the fluid complex containing residual aluminum chloride from the distillation zone.

2. The method according to claim 1 wherein the residual fluid complex separated from the distillation zone is further treated for the removal of additional aluminum chloride.

3. The method according to claim 1 wherein the fluid complex separated from the distillation zone is intimately contacted with water for the dissolution of soluble aluminum chloride contained therein.

4. In the recovery of anhydrous aluminum chloride from an aluminum chloride-hydrocarbon complex formed during the catalytic conversion of hydrocarbons in the presence of aluminum chloride as a catalyst, by distillation in the absence of a solvent, while preventing the formation of solid residues during the distillation and permitting removal of residual complex from the still in fluid form, the method which comprises flowing through said complex a gaseous material inert thereto during the distillation, and discontinuing the distillation at a point where less than 50 per cent of the aluminum chloride present in the complex has been vaporized.

5. A process for the recovery of anhydrous aluminum chloride from an aluminum chloride-hydrocarbon complex formed during the catalytic conversion of hydrocarbons in the presence of aluminum chloride as a catalyst, which comprises subjecting said complex to distillation, in the absence of a solvent and at a temperature in the range of 400 to 675° F., flowing through said complex during said distillation a gaseous material inert thereto, supplying heat for said distillation of said complex by means of said inert gas, removing not more than about 50 per cent of the aluminum chloride as an overhead vaporized anhydrous product entrained in said gaseous material, the residual complex remaining in fluid state, separating the residual fluid complex, and contacting said residual complex with water for the dissolution of aluminum chloride therefrom, and recovering hydrated aluminum chloride from the water solution.

6. A process for the recovery of aluminum chloride from an aluminum chloride-hydrocarbon complex formed during the catalytic conversion of hydrocarbons in the presence of aluminum chloride as a catalyst, which comprises subjecting said complex to distillation in the absence of a solvent and at a temperature in the range of 450 to 675° F., flowing through said complex a gaseous material inert thereto during distillation, supplying heat for said distillation of said complex by means of said inert gas, removing not more than about 50 per cent of the aluminum chloride as an overhead vaporized anhydrous product entrained in said gaseous material, the residual complex remaining in fluid state, separating the residual fluid complex, introducing the residual fluid complex into a separate coking zone, and subjecting said complex to elevated temperatures to liberate additional aluminum chloride therefrom.

7. A process for the recovery of aluminum chloride from an aluminum chloride-hydrocarbon complex formed during the catalytic conversion of hydrocarbons in the presence of aluminum chloride as a catalyst, which comprises subjecting said complex to distillation and continuing the distillation while flowing through said complex a gaseous material inert thereto until a substantial portion of the aluminum chloride contained in said complex is separated therefrom entrained in said gaseous material, carrying out said distillation by raising the temperature from 400 to 640° F. over a period of 80 minutes, supplying heat for said distillation of said complex by means of said inert gas, recovering said separated aluminum chloride in anhydrous form, discontinuing the distillation while the residual complex is still in fluid form, removing said residual complex from said distillation zone, and subjecting said fluid residual complex to elevated temperatures in a coking zone to liberate additional aluminum chloride therefrom.

8. A process for the recovery of aluminum chloride from an aluminum chloride-hydrocarbon complex formed during the catalytic conversion of hydrocarbons in the presence of aluminum chloride as a catalyst, which comprises introducing said complex into a distillation zone, preheating a gaseous material inert to said complex to a temperature above the distillation temperature, introducing said preheated gaseous material into said complex in said distillation zone to volatilize and entrain aluminum chloride as an overhead product, continuing the distillation and flow of preheated gaseous material through said complex until not more than about 50% of the aluminum chloride is separated in the anhydrous form, said distillation taking place in the absence of a solvent and at a temperature raised from 400 to 600° F. over a period of one hour, the residual complex remaining in a fluid state, separating the residual fluid complex, and recovering additional aluminum chloride from said residual complex.

HOWARD R. SAILORS.
HAROLD J. HEPP.

REFERENCES CITED

The following references are of record in the file of this patent:

UNITED STATES PATENTS

| Number | Name | Date |
| --- | --- | --- |
| 1,322,762 | Cobb | Nov. 25, 1919 |
| 1,426,081 | Hoover | Aug. 15, 1922 |
| 1,427,626 | Owen | Aug. 29, 1922 |
| 1,430,109 | Owen | Sept. 26, 1922 |
| 1,460,110 | Owen | June 26, 1923 |
| 2,228,527 | Meyer | Jan. 14, 1941 |
| 2,464,682 | Hepp | Mar. 15, 1949 |